March 14, 1967 F. A. OLSON 3,309,628

YIG BROADBAND VARIABLE ACOUSTIC DELAY LINE

Filed May 7, 1965 3 Sheets-Sheet 1

INVENTOR.
FRANK A. OLSON
BY
Townsend and Townsend
ATTORNEYS

INVENTOR.
FRANK A. OLSON
BY
Townsend and Townsend
ATTORNEYS

YIG BROADBAND VARIABLE ACOUSTIC DELAY LINE

Filed May 7, 1965 3 Sheets-Sheet 3

INVENTOR.
FRANK A. OLSON
BY
Townsend and Townsend
ATTORNEYS

United States Patent Office 3,309,628 Patented Mar. 14, 1967

3,309,628

YIG BROADBAND VARIABLE ACOUSTIC DELAY LINE

Frank A. Olson, Palo Alto, Calif., assignor, by mesne assignments, to Teledyne, Inc., Hawthorne, Calif., a corporation of Delaware Filed May 7, 1965, Ser. No. 454,062
8 Claims. (Cl. 333—30)

The present invention relates in general to a broadband variable delay line and more particularly to a variable delay line utilizing magnetoelastic coupling and propagation of acoustic waves in a ferrimagnetic material.

Broadly stated, the present invention, to be described in greater detail below, is directed to a broadband microwave variable delay apparatus in which input and output microwave signals are respectively coupled at input and output regions of a ferrimagnetic signal crystal material such as yittrium-iron garnet commonly called YIG to produce in the material an acoustic wave propagating substantially from the input region to the output region and with means for moving one of said regions to change the effective path length of the acoustic wave from the input to the output region for varying the time delay between the input and output microwave signals.

A primary advantage of this invention lies in the fact that since the great majority of the delay occurs during acoustic wave propagation which is non-dispersive, the delay will be essentially the same for all frequencies with a given spacing between input and output regions so that broadband operation is possible.

Another aspect of the present invention is the provision of a steep magnetic step field in one of the input or output regions of sufficient strength for coupling between a microwave signal and a spin wave and coupling between a spin wave and an acoustic wave all within a small or narrow region of the crystal to provide the same delay for a broad range of frequencies and means for varying the location of this region to vary the delay.

Within the scope of the present invention there are several ways for typically varying the location of the coupling region along the ferrimagnetic material. The requisite magnetic field can be provided by a permanent magnet or a solenoid associated with an RF coupling loop or coil, and the coil and magnet or solenoid can be physically moved to change the position of the coupling region. The use of a permanent magnet avoids the requirement for additional current supply such as required for operating a solenoid. On the other hand in systems designed for operation over a long period of time without possibility of adjustment the solenoid avoids the difficulty of the change in the field strength of a permanent magnet over an extended period of time.

Instead of utilizing a magnet and coil at both the input and output coupling assemblies, a compressional or shear acoustic wave transducer located at one end of the YIG rod can serve as one coupling assembly. In this case either the magnet and coil or the rod or both can be moved to vary the delay of the microwave signal.

In accordance with another aspect of the present invention the ferrimagnetic material can be in the form of a substantially elongate member with a helically coiled coupling loop positioned along its length and with means for varying the position of a step in a magnetic field established therealong. The magnetic field can be established with a variable step using a series of gapped laminations each of which is a small electromagnet. Changing the activation of the various electromagnets changes the location of a step in the magnetic field along the length of the magnetic material. This construction avoids the necessity for mechanical movement of the means for establishing the magnetic field.

Other objects of the present invention will become apparent upon reading the following specification and referring to the accompanying drawings in which similar characters of reference represent corresponding parts in each of the several views.

Figures 1, 1B:
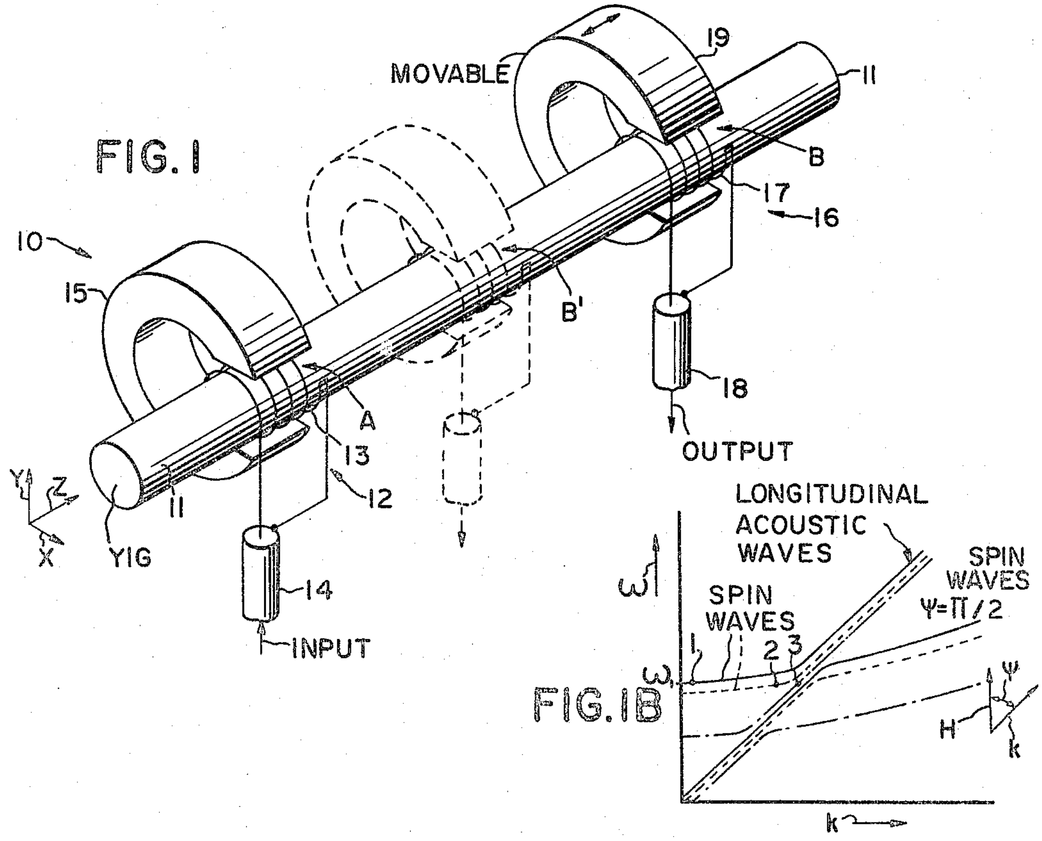
FIG. 1 is a perspective view schematically illustrating one variable delay apparatus in accordance with the present invention.
FIG. 1B is a graph of frequency versus wave number illustrating operation of the present invention.
Figure 1A:
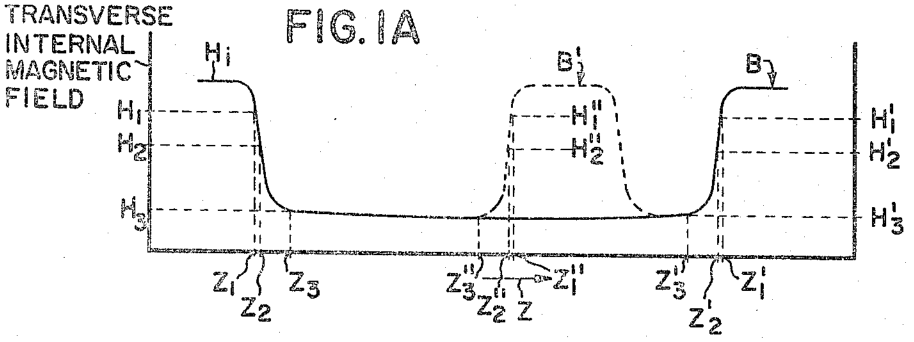
FIG. 1A is a graph of the transverse internal magnetic field along the length of the ferrimagnetic material illustrated in the apparatus of FIG. 1 and schematically depicting the operation of the present invention.
Figures 2, 2A, 2B:
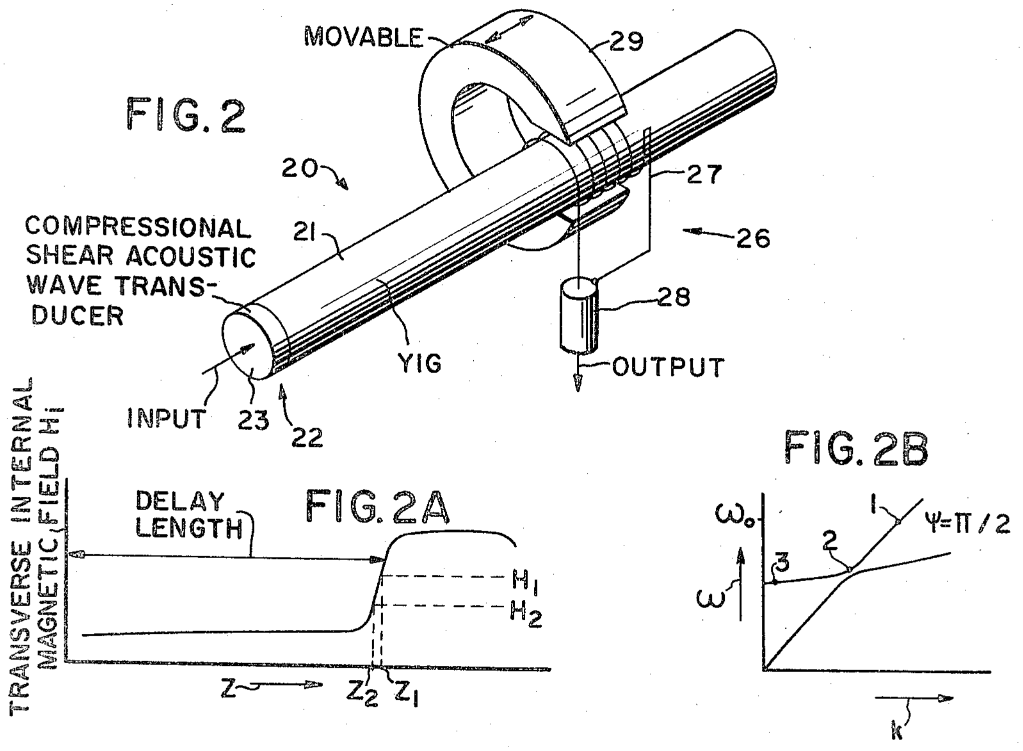
FIG. 2 is a perspective view schematically illustrating an alternative embodiment of the present invention.
Figure 3:
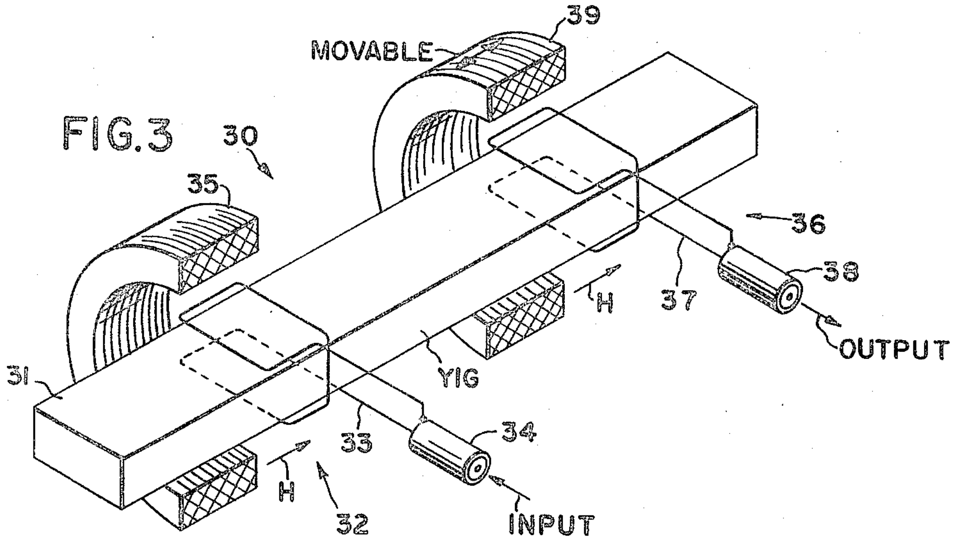
Figures 3A, 3B, 4, 4A:
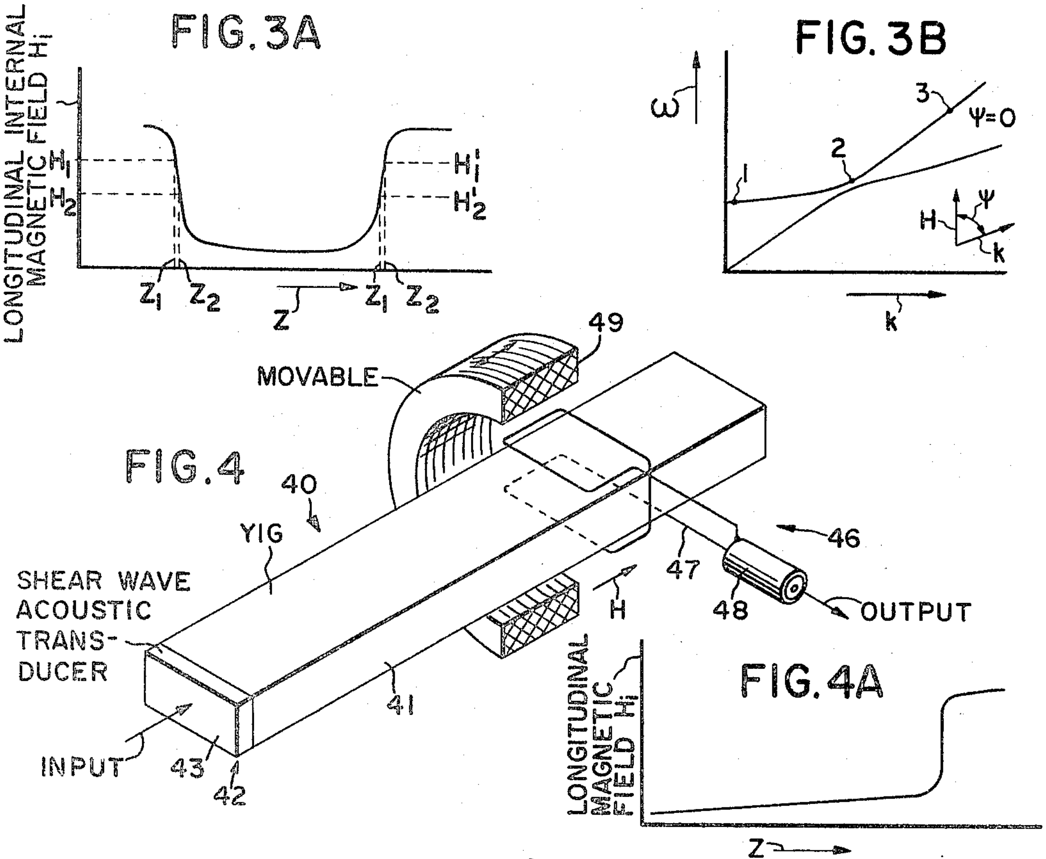
Figures 5, 5A:
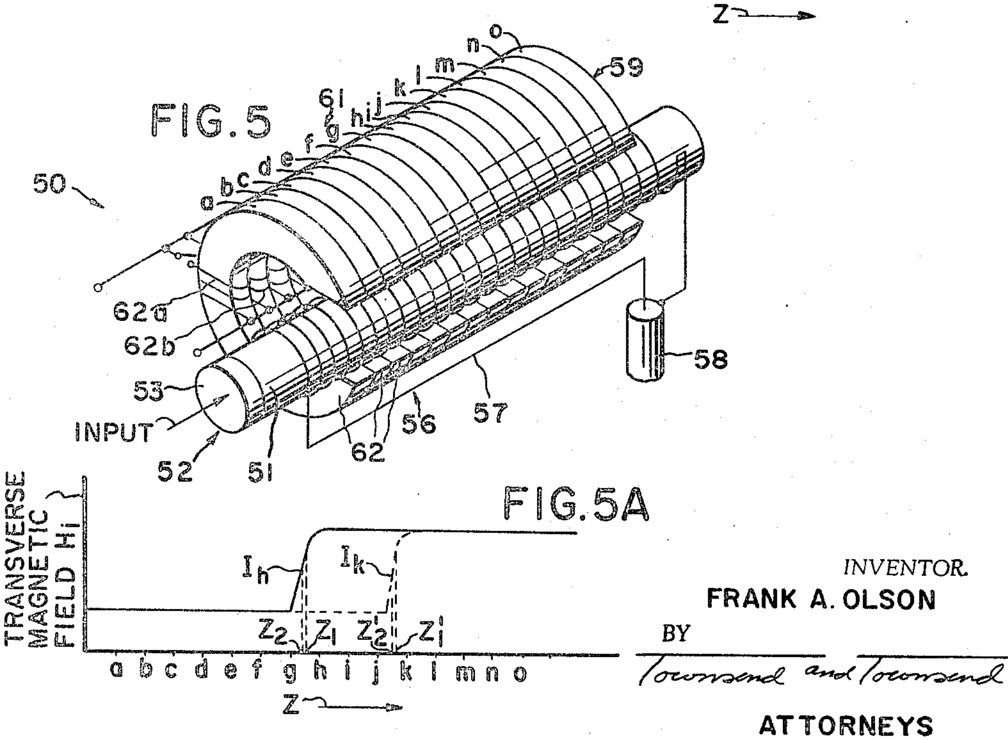

FIGS. 2A ond 2B are graphs similar to FIGS. 1A and 1B but illustrating operation of the apparatus shown in FIG 2;

FIG. 3 is a perspective view illustrating still another alternative embodiment of the present invention;

FIGS. 3A and 3B are graphs similar to FIGS. 1A and 1B but illustrating operation of the structure shown in FIG. 3;

FIG. 4 is a perspective view of still another alternative embodiment of the present invention;

FIG. 4A is a graph similar to FIG. 1A but illustrating the operation of the apparatus shown in FIG. 4;

FIG. 5 is a perspective view of still another alternative embodiment of the present invention; and FIG. 5A is a graph similar to FIG. 1A but illustrating operation of the apparatus shown in FIG. 5.

Referring now to FIG. 1, there is illustrated a broadband variable delay apparatus 10 in accordance with the present invention and including a ferrimagnetic single crystal material 11 such as, for example, a YIG rod adapted for propagating spin waves and acoustic waves. An input coupling assembly 12 is provided at one region A along the length of the rod 11 and includes a circular coupling coil or loop 13 which has its ends connected respectively to the center conductor and the outer conductor of a coaxial line 14 carrying an input signal. A magnetic field H orthogonal to the microwave magnetic signal. A magnetic field H orthogonal to the microwave magnetic field produced by the loop 13 is provided by a permanent magnet 15, the pole faces of which are positioned on opposite sides of the rod 11 to provide a steady state magnetic field $H_i$ normal to the axis of the rod 11 with a steep step in the magnetic field strength.

Spaced along the length of the rod 11 at a position B from the input coupling region A is a movable output coupling assembly 16. The output assembly 16 includes an output coupling loop 17 arranged in the same manner with respect to the rod 11 as the input coupling loop 13 and connected to an output coaxial line 18. The output coupling assembly 16 also includes a permanent magnet 19 similar to magnet 15 for establishing a field H′ orthogonal to the field of loop 13, and the entire output coupling assembly 16 is movable axially of the rod 11 by a conventional structure such as, for example, a micrometer drive. By moving the output coupling assembly 16 from position B to another position B′ shown in phantom in FIG. 1, the time delay between the input and output microwave signals is changed. Naturally, as will appear in greater detail below, instead of moving the output assembly 16, the input assembly 13 or both assemblies can be moved to change the spacing between the input and output assemblies 12 and 16 along the length of the rod 11.

The steep steps in the magnetic fields in the input and output coupling assemblies 12 and 16 are accomplished with structures well known in the art such as, for example, properly designed and confined pole pieces and/or the provision of bucking fields.

The operation of the variable delay apparatus illustrated in FIG. 1 is schematically illustrated in FIG. 1A which shows a plot of the transverse internal magnetic field $H_i$ within the YIG rod 11. A microwave input signal produced in the rod 11 by the coupling loop 13 of frequency $\omega=\gamma H_1$ couples to a magnetic net dipole moment existing due to the nonuniform field $H_i$ to establish magnetic precessional motion at position $Z_1$ where $H_i$ equals $H_1$. This corresponds to exciting a long wavelength spin wave $k\sim 0$ at the point designated 1 on the solid curve in the dispersion diagram of FIG. 1B. As the spin wave propagates to the right in FIG. 1A, the field $H_i$ decreases sharply at the edge of the input coupling assembly so that the spin wave dispersion curve is lowered such as to become the dashed curve as shown in FIG. 1B. Thus, the wave number of the spin wave increases and where the field $H_i$ equals $H_2$ designated at point 2 on the lowered dashed curve in FIG. 1B, the spin wave becomes an acoustic wave due to magneto-elastic coupling. This acoustic wave travels to the right in FIG. 1A and enters the region marked by $Z_3$ where $H_i \approx H_3$. This condition is indicated as point 3 on the still further lowered dot and dash dispersion curve in FIG. 1B. For clarity of understanding the curves are spaced apart at the lower left and upper right of FIG. 1B.

From the position $Z_3$ at the edge of the strong magnetic field of the input coupling assembly 12 the acoustic wave in turn travels along the rod to the right in FIG. 1A at the appropriate acoustic velocity to the region $Z_3'$ at the edge of the strong magnetic field of the output coupling assembly 16 and therein onto region $Z_2'$ where $H_i$ equals $H_2'$. At $Z_2'$ the acoustic wave converts by reverse order from point 3 to point 2 in FIG. 1B to a spin wave which travels to region $Z_1'$ at which the spin wave motion creates an $H_{RF}$ which is picked up by the loop 17 of the output coupling assembly and coupled out as an output signal. The output signal has been delayed relative to the input signal by approximately the distance from $Z_2$ to $Z_2'$ divided by the acoustic velocity. The distance from the $Z_1$ to $Z_2$ is so short that it is negligible for most delayed purposes, especially where the steepness of the steps in the internal field $H_i$ are as sharp as possible. In order to clearly illustrate the operation of the present invention, the steps in $H_i$ shown in FIG. 1A and the relative values of $H_1$, $H_2$, and $H_3$ are not drawn exactly to scale.

For an input signal of frequency $\omega_2=\gamma H_2$, the process works as before but with spin waves existing at $Z_2$ and subsequent conversion to acoustic waves at another value of Z where $H_i$ is slightly lower than $H_2$ and with subsequent propagation along the rod by acoustic waves. The change in acoustic path length due to a change in signal frequency may be made small by making the steps in the internal field $H_i$ very steep so that the time delay is substantially the same for signal frequencies over a broad frequency range. The frequency range of operation is given as $$\omega_{max}=\gamma H_{max}$$

where $H_{max}$ is the top value of the step field and $$\omega_{min}=\gamma H_{min\ effective}$$

where $H_{min}$ is the bottom of the step field plus the value or increment of field necessary to change from $K\sim 0$ spin waves to nearly pure acoustic waves. By way of example in the apparatus as described above, this increment of field is only approximately 10 oe. at S-band frequencies. To cover S-band $\omega_{max}$ equals $2\pi$ (4 gc.) and $\omega_{min}$ equals $2\pi$ (2 gc.) so that $H_{max}$ is 1673 oe. and $H_{min}$ effective is 1130 oe. Therefore, the step in the field must be approximately 543 oe. to achieve equal delay for signal frequencies in the frequency range from 2 to 4 gc.

By changing the position of the output coupling assembly 16 from B to B' conversion from acoustic waves to spin waves will occur in the output coupling assembly at $Z_2''$ shown in FIG. 1A and from spin waves to $H_{RF}$ at $Z_1''$ whereby the signal at the output has been delayed by approximately the distance from $Z_2$ to $Z_2''$ divided by the acoustic velocity.

The limit on the range of valuable delay is determined by two factors. First, the minimum delay is dependent upon how close the coupling loops and associated magnets can be placed while still maintaining the appropriate step in the field, and secondly, the maximum delay is dependent upon the length of the ferrimagnetic rod. It is possible to decrease the minimum delay and/or increase the maximum delay by using a different form of input or output circuit as will be described below with reference to FIG. 2.

Figure 1C:
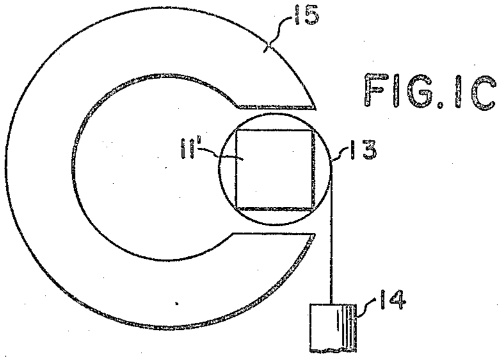
FIG. 1C is an end elevational view of an alternative structure to that illustrated in FIG. 1.

The rod can be of any cross sectional shape as circular as shown in FIG. 1 or square as shown in FIG. 1C.

Referring now to FIG. 2 there is shown an alternative construction for a broadband variable delay line 20 wherein the YIG rod 21 is provided with an input coupling assembly 22 at one end thereof for generating acoustic waves in the rod 21. The input coupling assembly 22 includes a compressional or shear acoustic wave transducer 23 for directly producing acoustic waves that propagate down the YIG rod 21 when a microwave input signal is applied thereto. Spaced along the length of the rod 21 is a movable output coupling assembly 26 which includes a coupling loop 27 coaxially aligned with the rod 21, connected to an output coaxial line 28, and positioned between the pole faces of a permanent magnet 29. The output coupling assembly 26 is movable longitudinally of the rod 21 for producing variations in the delay of the microwave signal coupled to the input coupling assembly 22 and coupled out of the output assembly 26.

FIGS. 2A and 2B illustrate the operation of the variable delay apparatus illustrated in FIG. 2. For FIG. 2B it is implied that there is a change of magnetic field between the points designated 1, 2, and 3 to produce a corresponding change in frequency at the points so that the points are at the same frequency as is the case illustrated in FIG. 1B.

In FIG. 2B the point designated 1 illustrates the conditions at which the acoustic wave is produced at the end of the YIG rod 21 by the input coupling assembly 22. This acoustic wave travels to the right in FIG. 2A in the Z direction along the rod 21 and arrives at $Z_2$ where the field due to the magnet 29 of the output coupling assembly 26 corresponds to magnetoelastic coupling as is illustrated at the point designated 2 in FIG. 2B. At $Z_2$ the field strength of the output coupling assembly is that corresponding to spin waves of $K\sim 0$ (shown as point designated 3 in FIG. 2B), and RF magnetic fields couple to the loop 27 and produce an output signal. The delay lengths for the delay apparatus 20 shown in FIG. 2 are variable from a very short path when the step field of the output coupling assembly 26 is very near the input end of the rod 21 to a path determined by the length of the crystal. Isolation between the input circuit 22 and the output circuit 26 reduces feed-through of extraneous signals in this delay apparatus. In order to increase the total delay produced with the assembly shown in FIG. 2, a non-magnetic crystal can be introduced between the transducer 23 and the end of the YIG rod 21. Naturally, instead of moving the output assembly 26 to produce variations in the delay, the rod itself can be moved to change the relative distance between input and output coupling assemblies and thereby change the delay.

Referring now to FIGS. 3, 3A and 3B there is illustrated still another embodiment of the present invention utilizing solenoids in the input and output coupling assemblies for the ferrimagnetic crystal material. As illustrated, the variable delay apparatus 30 includes a YIG rod 31 with, for example, a rectangular cross section. Positioned at spaced apart locations along the length of the rod 31 are input and output coupling assemblies 32 and 36, respectively. The input coupling assembly 32 includes a coupling loop 33 with turns positioned above and below the broad side of the rod 33 and connected to an input coaxial line 34 for establishing an $H_{RF}$ normal to the axis of the rod. A solenoid 35 is provided around the rod 32 and the loop 33 for establishing the steady state or D.C. magnetic field $H_i$ longitudinally of the rod. Similarly, the output coupling assembly 36 includes a wire loop 37 connected to a coaxial line 38 for producing an $H_{RF}$ normal to the axis of the rod 32 and a surrounding solenoid 39 for producing a magnetic field $H_{DC}$ longitudinally of the rod 31.

Referring now to FIGS. 3A and 3B for an explanation of the operation of the structure shown in FIG. 3, the input microwave signal at input coupling assembly 32 couples to the magnetic modes of the rod at an $H_i$ field of $H_1$ occurring at $Z_1$ to produce at the point designated 1 in FIG. 3B spin waves which propagate parallel to the $H_{DC}$. For FIG. 3B the same field change is implied as described above for FIG. 2B. When the spin wave from $Z_1$ arrives at $Z_2$ where $H_i$ equals $H_2$ a conversion to acoustic waves occurs (at the point designated 2 in FIG. 3B). These acoustic waves propagate on in the region of minimum field as indicated at the point designated 3 in FIG. 3B, and the process is reversed at the region of the output coupling assembly 36 to produce the output signal. Again, as in the previous constructions, the delay occurring in the YIG rod is non-dispersive so that the variable delay apparatus is operable over a wide frequency range. Variation in the delay is achieved by moving the output coupler and solenoid along the rod. Again, the input coupling assembly 32 could be moved instead by itself or in conjunction with movement of the output coupling assembly, the relative positions of the input and output coupling assemblies being the critical factor.

Referring now to FIGS. 4 and 4A there is illustrated a variable delay line 40 with a YIG rod 41 and output coupling assembly 46 similar to the structure shown in FIG. 3 but with an input coupling assembly 42 including a compressional or a shear acoustic wave transducer 43. Acoustic waves are produced at the input transducer 43, propagate to the magnetic step in the rod 41 due to the field of the solenoid 49 at output coupling assembly 46, and couple out via the coil 47 to coaxial line 48. Again, the minimum amount of delay is made possible by using the transducer coupler at the input end of the rod.

While with reference to FIGS. 2 and 4 variable delay has been described as achieved by the movement of either the movable output coupling assembly or the rod or both, it can be seen that the transducer can be provided at the output end of the rod and the input assembly positioned along the length of the rod in which case either the input coupling assembly can be moved relative to the rod or the rod relative to the input coupling assembly or both to change the delay.

Variable delay without physically moving the parts is also possible by using a plurality of distributed couplers and (saturating or) sweeping magnetic field sources. For example, the structure shown in FIG. 2 can be changed to that shown in FIG. 5 wherein the broadband variable delay line 50 includes a YIG rod 51 provided with an input coupling assembly 52 having a transducer 53 at one of the rod ends and an elongate output coupling assembly 56 extending over a substantial length of the rod 51. The output coupling assembly includes a wire loop 57 having a large number of turns surrounding the rod 51, extending over a considerable length of rod, and connected to an output coaxial line 58. An elaborate magnet assembly 59 extends along that length of rod surrounded by the loop 57. As shown, the magnet assembly includes a plurality of individual laminations 61 designated *a* through *o* each having separate current windings designated 62*a* through 62*o* thereby to form a series of electromagnets. The windings 62*a*–62*o* are switchably connected to a current source (not shown) such as, for example, either individually or in a parallel series so that by switching the current source the position of a step in the magnetic field can be varied along the length of the rod 51.

Operation of the device shown in FIG. 5 is illustrated with reference to FIG. 5A. As shown in FIG. 5A coupling is distributed over the length of the rod but actual coupling of the desired nature takes place only at the region where the step occurs in the $H_i$ field. The location of the step in the internal magnetic field $H_i$ is controlled and changed by changing the connection of the windings 62 to the current source. With the lamination windings nearest the input coupling assembly 52 sequentially disconnected from the current source, the step in the field can be moved in small increments toward the right. As shown by the solid magnetic field line designated $I_b$ with lamination windings *a* through *g* disconnected the step in the magnetic field occurs at lamination *h* in which case the acoustic waves set up spin waves at Z and the spin waves couple out as microwaves at $Z_1$. Then by disconnecting lamination windings *h* through *j* the step in the $H_i$ field is shifted to lamination *k* as shown by the dotted line $I_k$ for production of spin waves and coupling to the output loop at $Z_2'$ and $Z_1'$, respectively. Therefore, the de-energization of laminations *h* through *j* changes the delay path from that which occurs from the input assembly to lamination *k* without any moving parts. Obviously, the input coupling assembly 52 can be changed to conform to one of the other types of input assemblies previously described. Also, the output coupling assembly 56 could serve as the input coupling assembly in a properly oriented construction.

Although the foregoing invention has been described in some detail by way of illustration and example for purposes of clarity and understanding, it is understood that certain modifications may be practiced within the spirit of the invention as limited only by the scope of the appended claims.

What is claimed is:

1. A broadband microwave variable delay apparatus comprising: means for propagating acoustic waves including a ferrimagnetic single crystal material; input coupling means for coupling an input microwave signal to an input region of said material for establishing an acoustic wave propagating within said material; output coupling means for setting up an output microwave signal from said propagating acoustic wave at an output region of said material spaced from said input region; at least one of said input and output coupling means, including means for establishing a magnetic field with a steep step in the magnetic field strength within said material in the region of said one coupling to cause conversion between an acoustic wave and a spin wave and between spin wave and a microwave signal; and means for moving the steep step magnetic field in said one coupling means longitudinally of said material to change the effective path length of said acoustic wave from said input region to said output region for varying the time delay between said input microwave signal and said output microwave signal.

2. The variable delay apparatus in accordance with claim 1 characterized further in that said means for moving said one of said regions includes means for moving said magnetic field means relative to said material.

3. The variable delay apparatus in accordance with claim 1 characterized further in that the coupling means at the other of said regions includes an acoustic wave transducer on an end of said material and said means for moving said one of said regions includes means for providing relative movement between said material and said magnetic field means.

4. The variable delay apparatus in accordance with claim 1 characterized further in that one of said coupling means includes a coupling loop for establishing or picking up radio frequency electromagnetic waves in said material and means for establishing a magnetic field within said material transverse to the magnetic field of said electromagnetic wave for converting between spin waves and said acoustic wave.

5. The variable delay apparatus of claim 4 characterized further in that said ferrimagnetic material is an elongate rod having a longitudinal axis, said loop is a coiled loop substantially coaxially aligned with said axis of said rod and said means for establishing said magnetic field includes a permanent magnet with its poles aligned for establishing a magnetic field directed substantially normal to said axis of said rod.

6. The variable delay apparatus of claim 4 characterized further in that said ferrimagnetic material is a substantially elongate member having a longitudinal axis, said loop is a helically coiled wire with its axes aligned substantially coaxial with the longitudinal axis of said rod and said means for establishing magnetic field includes a series of laminations aligned along the length of said rod, each of said laminations arranged for establishing a magnetic field substantially transverse to the axis of said rod and said means for moving one of said regions of said material including means for changing the magnetic field in certain of said laminations.

7. The variable delay apparatus of claim 4 characterized further in that said means for establishing a magnetic field is a solenoid and said loop is arranged with its axes normal to the axes of said solenoid.

8. A broadband microwave variable delay apparatus comprising: means for propagating acoustic waves including a ferrimagnetic single crystal material; input coupling means for coupling an input microwave signal to an input region of said material for establishing an acoustic wave propagating within said material; output coupling means for setting up an output microwave signal from said propagating acoustic wave at an output region of said material spaced from said input region; one of said coupling means at one of said regions including means for establishing a magnetic field in said one region, said magnetic field having a steep step in the field strength thereof within said region for converting between said acoustic wave and a spin wave and between said spin wave and a microwave signal and for maintaining minimum propagation as a spin wave in said region; and means for moving said one region of said material to change the effective path length of said acoustic wave from said input region to said output region for varying the time delay between said input microwave signal and said output microwave signal.

References Cited by the Examiner

UNITED STATES PATENTS

| | | | |
|---|---|---|---|
| 3,121,849 | 2/1964 | Matthews | 330—4.6 |
| 3,215,944 | 11/1965 | Matthews | 330—5 |
| 3,244,993 | 4/1966 | Scholoemann | 330—4.8 |

OTHER REFERENCES

Strauss, "IEEE Transactions on Sonics and Ultrasonics," November 1964, pp. 85–89. (Copy in Scientific Library.) 333–30.

Strauss, "Proc. IEEE," October 1965, pp. 1485–1495. (Copy in Sci. Lib. and Gr. 252).

References Cited by the Applicant

J. R. Eshbach, Physical Review Letters, vol. 8, p. 357 (1962).

J. R. Eshbach, Journal of Applied Physics, vol. 34, p. 1298 (1963).

E. Schlomann, Journal of Applied Physics, vol. 35, p. 159 (1964).

ROY LAKE, *Primary Examiner.*

D. R. HOSTETTER, *Assistant Examiner.*